US009938878B2

(12) United States Patent
Ferront et al.

(10) Patent No.: US 9,938,878 B2
(45) Date of Patent: Apr. 10, 2018

(54) CATALYTIC CONVERTER DEVICE WITH INJECTION SECTION

(71) Applicant: Eberspächer Exhaust Technology GmbH & Co. KG, Neunkirchen (DE)

(72) Inventors: Herve Ferront, Esslingen (DE); Laurent Cazeneuve, St. Remy l'Honore (FR); Heike Többen, Uhingen (DE); Sophie Rilly, Issy les Moulineaux (FR); Tobias Wolf, Köngen (DE); Sophie Kermorvant, Massy (FR)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 622 days.

(21) Appl. No.: 14/519,624

(22) Filed: Oct. 21, 2014

(65) Prior Publication Data

US 2015/0110681 A1    Apr. 23, 2015

(30) Foreign Application Priority Data

Oct. 22, 2013   (DE) .................. 10 2013 221 428
Nov. 12, 2013   (DE) .................. 10 2013 223 033

(51) Int. Cl.
    *F01N 3/28*     (2006.01)
    *F01N 3/20*     (2006.01)
    *F01N 13/00*    (2010.01)

(52) U.S. Cl.
    CPC ......... *F01N 3/2892* (2013.01); *F01N 3/2066* (2013.01); *F01N 13/0097* (2014.06); *F01N 2240/20* (2013.01); *F01N 2490/08* (2013.01); *F01N 2610/02* (2013.01); *F01N 2610/1453* (2013.01); *Y02T 10/24* (2013.01); *Y10T 137/0324* (2015.04); *Y10T 137/87571* (2015.04)

(58) Field of Classification Search
None
See application file for complete search history.

(56) References Cited

U.S. PATENT DOCUMENTS

| 9,346,017 B2 * | 5/2016 | Greber ............... F01N 3/2066 |
| 2011/0167810 A1 * | 7/2011 | Lebas ............... B01F 3/04049 |
| | | 60/324 |
| 2012/0144812 A1 | 6/2012 | Hyun |

FOREIGN PATENT DOCUMENTS

| DE | 10 2009 036511 A1 | 2/2011 |
| WO | 2010/146285 A1 | 12/2010 |
| WO | WO 2012080585 A1 * | 6/2012 ........... F01N 3/2066 |

* cited by examiner

*Primary Examiner* — Walter D. Griffin
*Assistant Examiner* — Jelitza M Perez
(74) *Attorney, Agent, or Firm* — McGlew and Tuttle, P.C.

(57) ABSTRACT

An injection section (12) of an exhaust system for an internal combustion engine, with a channel (13) for guiding an exhaust gas flow (3), with an injection port (14), laterally on the channel to which a liquid or gas injector (15) can be connected, and with an injection chamber (16), formed in the channel in the area of the injector port. The chamber is defined by a perforated, first flow through partition (17), arranged in the channel upstream of the injector port relative to the exhaust gas flow and, and by a perforated, second flow through partition, arranged in the channel downstream of the injector port relative to the exhaust gas flow. Improved mixing and/or evaporation is achieved with the perforation portion of the first partition generating at least two partial exhaust gas flows (20, 21), which form two mutually opposite flow swirls (22, 23).

20 Claims, 3 Drawing Sheets

CATALYTIC CONVERTER DEVICE WITH INJECTION SECTION

CROSS REFERENCE TO RELATED APPLICATIONS

This application claims the benefit of priority under 35 U.S.C. § 119 of German Patent Application DE 10 2013 221 428.6 filed Oct. 22, 2013 and German Patent Application DE 10 2013 223 033.8 filed Nov. 12, 2013, the entire contents of which are incorporated herein by reference.

FIELD OF THE INVENTION

The present invention pertains to an injection section of an exhaust system for an internal combustion engine. The present invention pertains, moreover, to a catalytic converter unit for an exhaust system of an internal combustion engine. Finally, the present invention also pertains to a method for introducing a liquid or gas into an exhaust gas flow of an internal combustion engine.

BACKGROUND OF THE INVENTION

A catalytic converter device, which has a tubular housing for guiding an exhaust gas flow, which the housing contains in an outlet section an SCR catalytic converter, wherein SCR denotes Selective Catalytic Reduction, is known from WO 2010/146285 A1. The housing has, in addition, an inlet section, which is arranged upstream of the outlet section in relation to the exhaust gas flow and contains an oxidation catalytic converter. An injection section is arranged between the inlet section and the outlet section, and another housing section designed integrally at the inlet section defines a channel of the injection section, which is likewise used to guide the exhaust gas flow. An injector port, at which an injector is connected for laterally injecting a liquid or gas into the exhaust gas flow, is arranged in the injection section laterally at the channel Lateral injection of the liquid, i.e., injection in such a way that a principal injection direction is sloped in relation to the axial direction of the channel, preferably in an angle range of 60° to 120°, especially in an angle range of 85° to 95° and preferably by about 90°, is brought about hereby. An injection chamber is formed in the channel of the injection chamber in the area of the injector port, the injection chamber being defined, on the one hand, by a perforated first partition, which is arranged upstream of the injector port in relation to the exhaust gas flow and through which the exhaust gas flow can flow, and, on the other hand, by a perforated second partition, which is arranged in the channel downstream of the injection section in relation to the exhaust gas flow and through which the exhaust gas flow can flow. The two partitions are designed and shaped in conjunction with their perforations in the prior-art catalytic converter device such that a swirling flow or turbulent flow or rotary flow, during which the entire exhaust gas flow rotates about the central longitudinal axis of the channel, develops in the injection chamber during the operation of the exhaust system. It is achieved hereby that a flow path in the injection chamber, which the exhaust gas flow follows from the first partition to the second partition, is at least 20% longer than an axial distance between the inlet section and the outlet section. A mixing section, in which the injected liquid can evaporate and mix with the exhaust gas flow, is created hereby.

The injected liquid is a reducing agent in an SCR system. An aqueous urea solution, which is ultimately converted by means of thermolysis and hydrolysis into ammonia and carbon dioxide in order to convert nitrogen oxides deposited in the SCR catalytic converter into nitrogen and water, is currently preferred in this case. On the one hand, the most complete evaporation possible of the reducing agent introduced in the liquid form is of decisive significance for the efficiency of such an SCR system. On the other hand, the most intense mixing possible of the evaporated reducing agent with the exhaust gas flow must be achieved as well.

As an alternative, a gaseous reducing agent, which is, for example, gaseous ammonia, may also be injected in modern SCR systems. It may be stored in this case in the form of solids, which are evaporated by means of heat supplied, for example, electrically, in order to generate the gaseous ammonia. The ammonia is thus available directly in the exhaust gas flow in these so-called Amminex systems, so that only an intensive mixing with the exhaust gas flow is necessary, because the evaporation already takes place in advance, outside the exhaust gas flow.

SUMMARY OF THE INVENTION

An object of the present invention is to propose an improved embodiment, which is characterized especially by an efficient evaporation effect and mixing for the injected liquid with the exhaust gas flow, for an injection section of the type described in the introduction or for a catalytic converter device equipped therewith as well as for a method for introducing a liquid into an exhaust gas flow.

According to the invention, an injection section is provided of an exhaust system for an internal combustion engine. The injection section comprises a channel for guiding an exhaust gas flow, an injector port arranged laterally on the channel and to which an injector can be connected for introducing a liquid or gas into the exhaust gas flow and an injection chamber. The injection chamber is formed in the channel in an area of the injector port. The injection chamber is defined by a perforated first partition, arranged in the channel upstream of the injector port relative to the exhaust gas flow and through which the exhaust gas flow can flow, and also a perforated second partition, arranged in the channel downstream of the injector port in relation to the exhaust gas flow and through which the exhaust gas flow can flow. A perforation portion of the first partition generates at least two partial exhaust gas flows, which form two mutually opposite flow swirls, during a flow through the first partition within the injection chamber. The two partial exhaust gas flows flow separately proximally to a channel wall, defining the injection chamber laterally, and together distally from the channel wall.

The present invention is based on the general idea of generating in the injection space two flow swirls, which are directed in opposite directions and are formed each by means of a partial exhaust gas flow. The two flow swirls are generated in the injection space such that the two partial exhaust gas flows flow separately proximally to a channel wall laterally defining the injection space and flow together or combined distally from the channel wall. The liquid or gas is injected into this system of flow swirls directed in opposite directions, as a result of which an intensive mixing takes place between the reducing agent and the exhaust gas and, in addition, efficient evaporation of the liquid takes place in case of a liquid reducing agent. The flow swirls lead, on the one hand, to a specific turbulence within the injection chamber, which improves the mixing between the reducing agent introduced and the exhaust gas flow. On the other hand, the flow swirls cause an exhaust gas path, which is followed by the exhaust gas flow within the injection chamber, to become longer. As a result, the residence time of the exhaust gas flow is thus prolonged, as a result of which more time is available for the evaporation and/or mixing of the liquid injected or of the gas injected.

Improved mixing and/or evaporation is achieved with the perforation portion of the first partition. The perforation portion forms flow swirls generation means for generating, within the injection chamber, at least two partial exhaust gas flows, which form two mutually opposite flow swirls. The two partial exhaust gas flows flow separately proximally to a channel wall defining the injection chamber laterally and flow together distally from the channel wall.

It is concretely proposed for the injection section according to the present invention that a perforation of the first partition be designed such that it generates during the flow through the first partition within the injection chamber at least the above-mentioned two partial gas flows (i.e. a two separate flow swirl generation means), which form two separate flow swirls directed in opposite directions, such that the two partial flows flow separately along the channel wall, i.e., along separate channel wall sections, while they flow together or combined distally from the channel wall, i.e., in a middle area of the injection chamber.

The generation of such a swirl system is supported by an essentially cylindrical shape for the channel, as a result of which the channel wall extends in a curved shape in the circumferential direction. The partial exhaust gas flows flow as a result proximally to the channel wall along same towards one another until they merge in an accumulation area and are deflected into the interior of the injection chamber, where they will then flow distally together to the channel wall. Further, the flow swirls rotate about separate swirl axes, which extend in parallel to the central longitudinal axis of the channel.

Preferred is an embodiment in which the perforation portion of the first partition is symmetrical to a central longitudinal plane of the channel, so that the two flow swirls can develop symmetrically to the central longitudinal plane during a flow through the first partition. A symmetrical injection jet, which can be established in an especially simple manner by means of a corresponding injector, can be taken into account by a symmetrical swirl system.

Corresponding to a variant, the injector port is preferably arranged in this central longitudinal plane. A principal direction of injection of the injector will then be in the central longitudinal plane in the mounted state. The efficiency of the evaporation or mixing can be improved by such a symmetrical arrangement.

In another embodiment, the two partial exhaust gas flows can flow away from the injector port proximally to the channel wall, while they flow together towards the injector port distally from the channel wall. This means that the combined partial exhaust gas flows flow against the injection jet in the center of the injection chamber, which significantly improves the mixing and possibly the evaporation.

In another embodiment, the perforation portion of the first partition may have first openings for generating the flow swirls, which partitions are arranged proximally to the channel wall and have a discharge area each facing away from the injector port in the injection chamber. The separate partial exhaust gas flows thus leave the first openings in a direction facing away from the injector port, as a result of which the direction of flow is already preset for inducing the flow swirls.

Corresponding to a variant, the discharge areas may be formed by means of integral wall sections of the first partition, which project from the rest of the first partition into the injection chamber. The discharge areas are shielded as a result against an injection jet, so that the injection jet cannot escape from the injection chamber through the first openings.

In another variant, the first opening may have an inlet area facing the injector port on an incoming flow side of the first partition, which side faces away from the injection chamber. It is achieved hereby that the partial exhaust gas currents can flow into the respective first opening through the inlet area through a direction leading away from the injector port only, as a result of which a preferred direction of flow needed for swirl formation is preset.

The inlet areas may be advantageously formed by means of integral wall sections of the first partition, which project from the rest of the first partition on the incoming flow side. The wall sections at the inlet areas and at the outlet areas may generate channeling of the partial exhaust gas flows flowing through them, which supports swirl formation. Further, integral wall sections can be opened from a preferably flat sheet metal body in an especially simple manner in order to form the desired first openings hereby at the same time.

The first openings of the perforation portion of the first partition are preferably formed proximally to the channel wall in the first partition. They are preferably located at spaced locations from one another in the circumferential direction. Moreover, the perforation portion of the first partition may have a plurality of second openings, which are arranged distally from the channel wall. These second openings may also have discharge areas facing away from the injector port and inlet areas facing the injector port, and wall sections formed on the first partition may be associated with these discharge areas and inlet areas, with some of these wall sections projecting into the injection chamber, while the other wall sections project from the first partition on the incoming flow side.

Further, provisions may be made in another embodiment for a perforation portion of the second partition to have openings, which are shielded with guide surfaces, which project into the injection space. Direct flow through the second partition is avoided by the shielded openings, because additional flow deflections are necessary, which contribute each to the mixing of evaporated liquid or gas and the exhaust gas flow.

According to a variant, the openings of the perforation portion of the second partition may have first openings, which are arranged proximally to the channel wall, and they are elongated and extend essentially in the circumferential direction and are shielded in the radially inner direction by the respective guide surface. It is achieved hereby that the areas of the flow swirl flowing proximally to the channel wall cannot pass directly through the first openings.

In another variant, the openings of the perforation portion of the second partition may have second openings, which are arranged distally from the channel wall and are shielded toward the injector port with the respective guide surface. Moreover, the second openings are preferably likewise elongated, but they extend in parallel to one another. Due to the second openings being shielded in the direction of the injector port, the common flow of the two flow swirls flowing distally from the channel wall can flow especially easily through these second openings, which is desired at the end of the swirling motion and reduces, on the whole, the flow resistance of the injection section.

The shielding of the openings of the perforation portion of the second partition prevents, in addition, an injection jet from passing directly through the second partition. This supports swirling and mixing. The guide surfaces may also act especially as impact surfaces, on which the injected liquid can impinge, which supports the evaporation of the liquid.

According to another advantageous embodiment, the first partition may extend essentially at right angles to a central longitudinal axis of the channel. The injection section has a comparatively compact design in the axial direction as a result.

The second partition may be sloped in another embodiment relative to the first partition, namely, such that the injection chamber tapers with increasing distance from the injector port. Contrary to this, the injection jet widens with increasing distance from the injector port, especially conically, as a result of which intensive mixing and possibly improved evaporation will, on the whole, become established.

Corresponding to an especially advantageous embodiment, a perforated third partition, through which the exhaust gas flow can flow, and which is arranged downstream of the second partition in relation to the exhaust gas flow, may be optionally provided. This additional third partition may be used, on the one hand, to reduce the risk of discharge of unevaporated liquid from the injection section. On the other hand, the flow can be steadied and homogenized in case of a corresponding design of a perforation portion of the third partition, which leads to an improved arrival of the flow at a catalytic converter that may possibly be arranged downstream especially within a catalytic converter device. For example, the third partition may be formed by a simple perforated plate, in which a plurality of comparatively small passage openings are provided, which are distributed uniformly over the entire surface of the third partition. In particular, no guide surfaces and the like are provided at the openings of the perforation portion in the third partition. As an alternative, the third partition may also be equipped with guide surfaces in order to guide the flow through the perforation portion of the third partition in a specific manner. The third partition preferably extends in a plane that extends at right angles to the central longitudinal axis of the channel. The passage openings will also lie in this plane.

A catalytic converter device according to the present invention comprises a tubular housing for guiding an exhaust gas flow, which housing contains an SCR catalytic converter in an outlet section. Further, the catalytic converter device is equipped with an injection section of the above-described type, which adjoins the outlet section upstream in relation to the exhaust gas flow. The injection section forms a separate assembly unit in this case that can be completely preassembled and can be attached to the housing of the catalytic converter device or can be installed in same. For example, the channel of the injection section may be inserted into a housing section of the housing intended herefor, so that the housing and the channel overlap axially and are radially adjacent to each other.

However, an embodiment in which the channel of the injection section forms in its turn a section of the housing of the catalytic converter device is preferred. The channel and the outlet section adjoin each other axially in this case.

In another embodiment, the housing may have an inlet section, which adjoins the injection section upstream in relation to the outlet section and which has an oxidation catalytic converter. A design in which the common housing of the catalytic converter device has at least three housing sections, which adjoin each other axially, namely, the inlet section and the outlet section as well as the housing section, which is arranged between them and is formed by the channel of the injection section.

Also conceivable is an embodiment in which the channel of the injection section has a flow cross section that is different from and is preferably larger than the outlet section and/or inlet section of the housing. The swirls can be formed as a result with especially large diameters, which is favorable for intensive mixing.

A method according to the present invention for introducing a liquid or gas into an exhaust gas flow of an internal combustion engine is based on the fact that a liquid or gas is injected into an injection chamber, through which the exhaust gas flow flows, laterally in relation to an exhaust gas flow. Two flow swirls directed in opposite directions, which consist of a partial exhaust gas flow each, are then generated in this injection chamber. The flow swirls are generated such that the two partial exhaust gas flows flow towards each other proximally to a channel wall defining the injection chamber laterally and along the channel wall and flow together and combined distally from the channel wall. The swirls has a comparatively large cross section as a result, as a result of which they contain a relatively large quantity of kinetic energy, which improves mixing.

It is apparent that the above-mentioned features, which will also be explained below, can be used not only in the respective combination indicated, but in other combinations or alone as well, without going beyond the scope of the present invention.

Preferred exemplary embodiments of the present invention are shown in the drawings and will be explained in more detail in the following description, where identical reference numbers designate similar or functionally identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
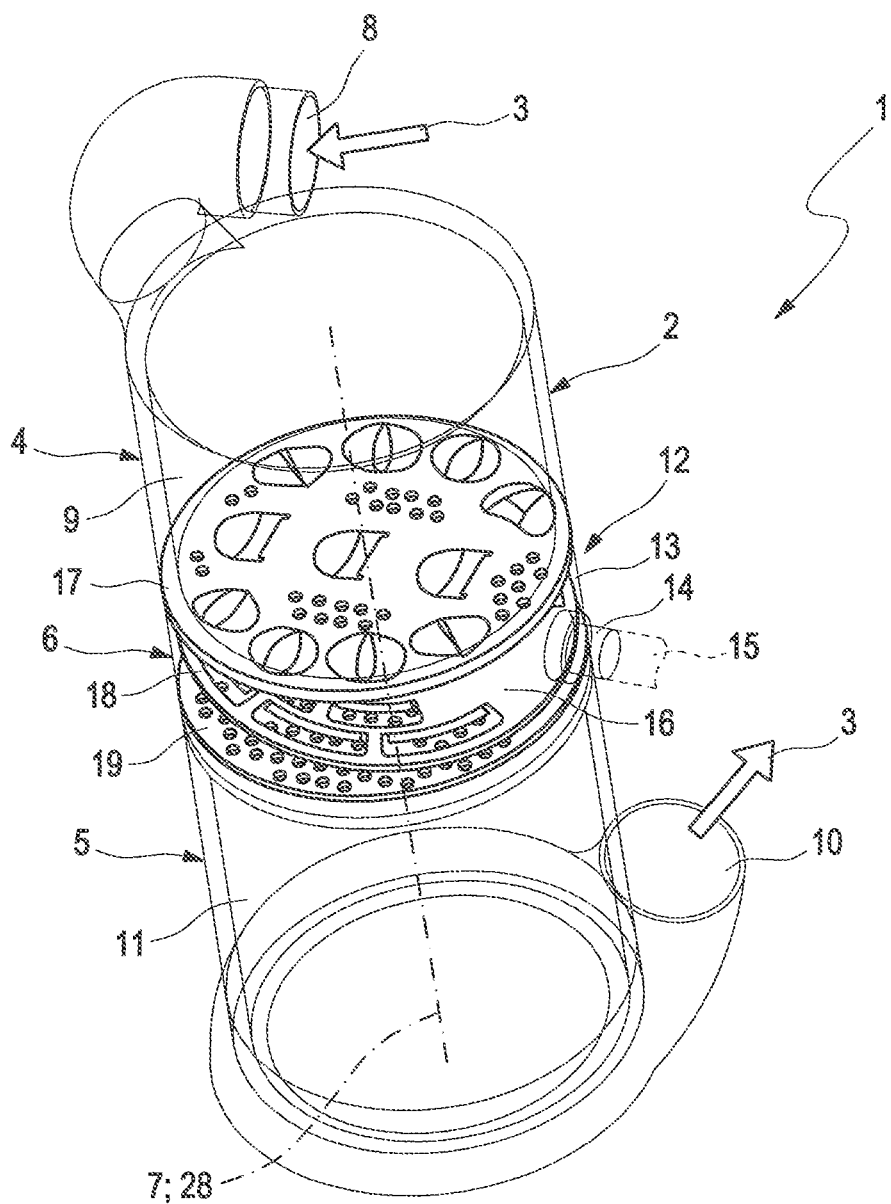
FIG. 1 is an isometric view of a catalytic converter device with transparent components.

Referring to the drawings in particular, corresponding to FIG. 1, a catalytic converter device 1, which is intended for use in an exhaust system of an internal combustion engine, preferably of a motor vehicle, comprises a tubular, preferably cylindrical housing 2, which is used to guide an exhaust gas flow 3 indicated by arrows in FIG. 1. The housing 2 has an inlet section 4, an outlet section 5 and a middle housing section 6, which is arranged axially between the inlet section 4 and the outlet section 5 in relation to a central longitudinal axis 7 of the housing 2. The inlet section 4 is fluidically connected with a housing inlet 8 and contains, e.g., an oxidation catalytic converter 9. The inlet section 4 could also contain a mixer, for example, in order to additionally mix injected hydrocarbons with the exhaust gas flow 3. The outlet section 5 is connected fluidically with a housing outlet 10 and contains an SCR catalytic converter 11. An injection section 12, by means of which a liquid reducing agent, preferably an aqueous urea solution, or a gaseous reducing agent, preferably ammonia gas, can be introduced into the housing 2 upstream of the SCR catalytic converter 11 and downstream of the oxidation catalytic converter 9, is formed in the middle housing section 6.

Figure 2:
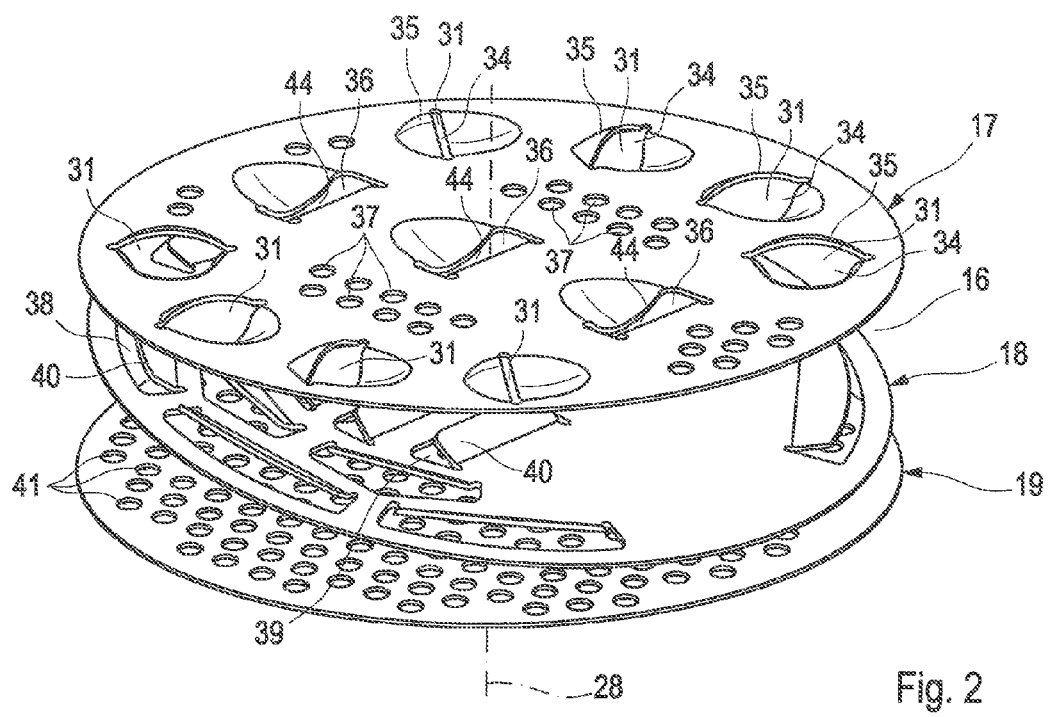
FIG. 2 is an isometric view of an injection section of the catalytic converter device, where only partitions of the injection section are shown.
Figure 3:
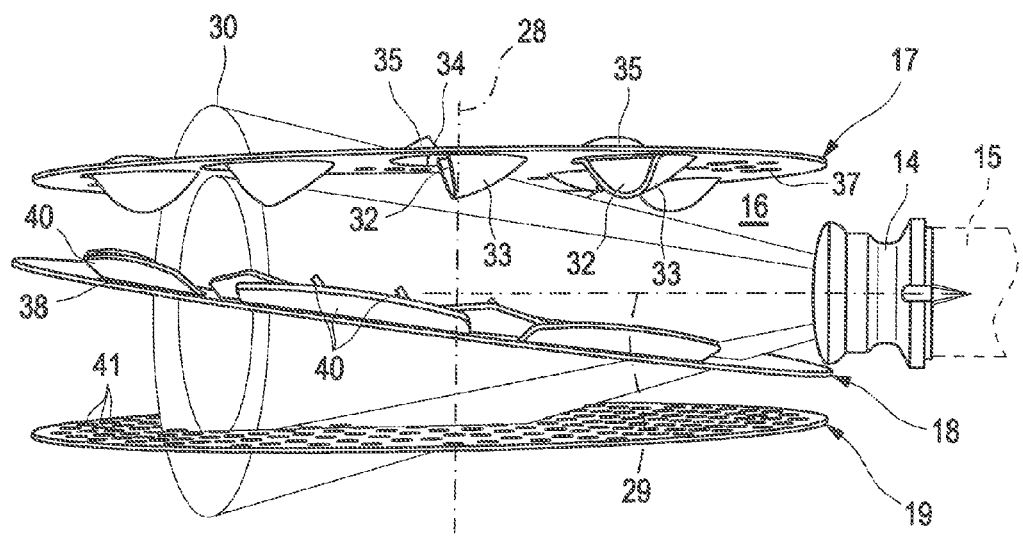
FIG. 3 is a side view of the injection section, where only the partitions and an injection section are shown.

Corresponding to FIGS. 1 through 4, such an injection section 12 comprises a channel 13 for guiding the exhaust gas flow 3. The channel 13 is designed as a cylindrical tube section in this case, which forms at the same time the middle housing section 6 of the housing 2 of the catalytic converter device 1. The injection section 12 comprises, further, an injector port 14, which is arranged laterally on the channel 13 and to which the injector 15 indicated by broken line in FIGS. 1 and 3 is connected, in order to make it possible to inject the respective liquid into the exhaust gas flow 3.

In the area of the injector port 14, the channel 13 contains an injection chamber 16, into which the injector 15 injects the reducing agent during the operation. The injection chamber 16 is defined by a first partition 17 upstream of the injector port 14 relative to the exhaust gas flow 3 and by a second partition 18 downstream of the injector port 14. In addition, a third partition 19, which is arranged downstream of the second partition 18 in the channel 13, is provided purely optionally in the preferred embodiment being shown here. The partitions 17, 18, 19 are separate components, which are preferably designed as shaped sheet metal bodies each. The partitions 17, 18, 19 extend each over the entire cross section of the channel 13; they are perforated (have a perforated portion with one or more perforations, openings or passages) and the exhaust gas flow can correspondingly flow through them.

Figure 4:
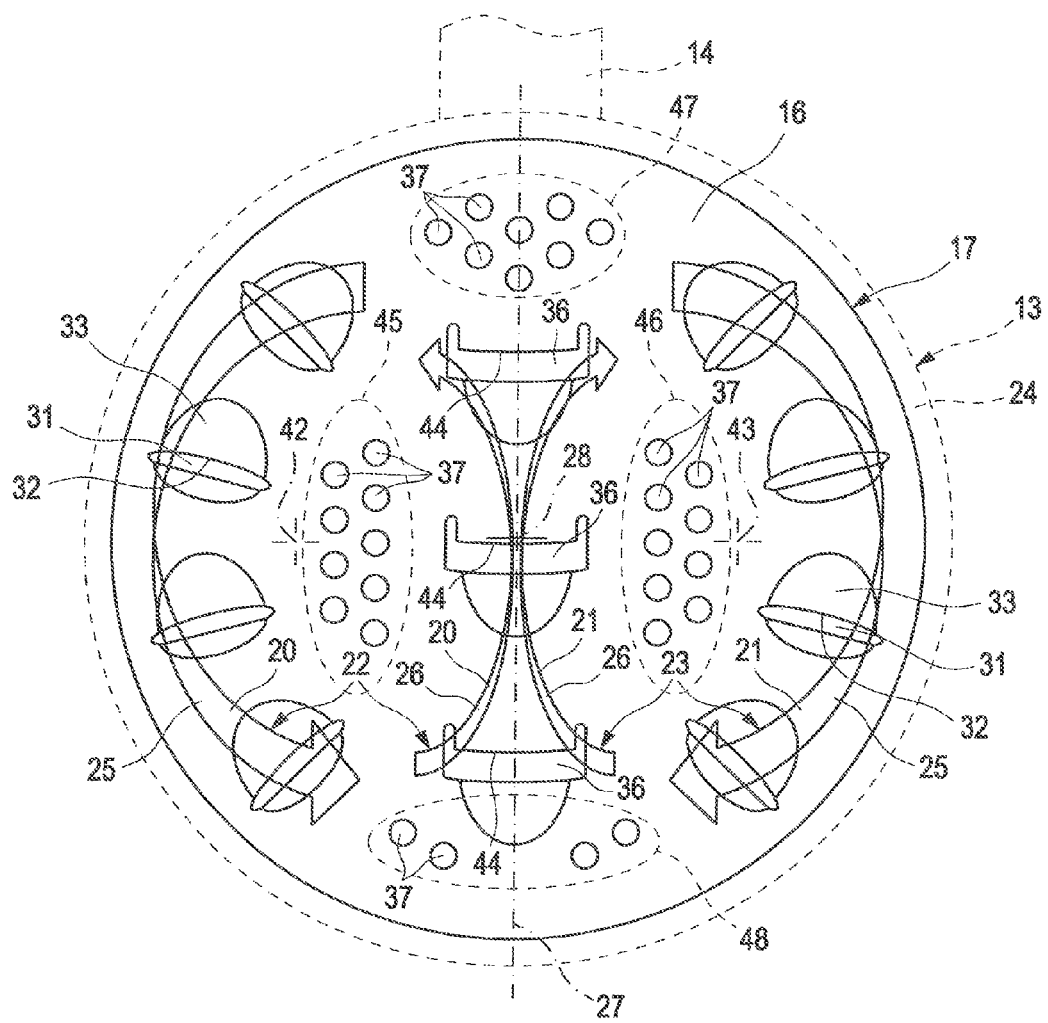
FIG. 4 is an axial view of a first partition of the injection section with arrows indicating the direction of flow.

A perforation portion of the first partition 17, not designated more specifically, is designed in this case such that during the flow through the first partition 17, it generates at least two partial exhaust gas flows 20, 21, which are indicated by arrows in FIG. 4. These partial exhaust gas flows 20, 21 are generated in this case such that they form two separate and mutually opposite flow swirls 22 and 23, respectively, in the injection chamber 16. Due to the flow swirls 22, 23, the two partial exhaust gas flows 20, 21 flow separately from one another in an area 25 extending proximally to a channel wall 24, whereas they flow more or less together in an area extending distally from the channel wall 24. The channel wall 24 defines the injection chamber 16 laterally, extends in the circumferential direction and forms the channel 13 as a result. The two flow swirls 22, 23 rotate about separate swirl axes 42, 43, which extend in parallel to one another.

The perforation portion of the first partition 17 is symmetrical, especially mirror symmetrical in relation to a central longitudinal plane 27 of the channel 13. The central longitudinal plane 27 contains a central longitudinal axis 28 of the channel 13, which axis coincides with the central longitudinal axis 7 of the housing 2 within the catalytic converter device 1. The two flow swirls 22, 23 are also symmetrical to the central longitudinal plane 27 due to the symmetry of the perforation portion of the first partition 17. The swirl axes 42, 43 preferably extend in parallel to the central longitudinal axis 28 of the channel 23. The first partition 17 is preferably arranged in the channel 13 such that the injector port 14 is located in the central longitudinal plane 27, i.e., in the plane of symmetry of the first partition 17. The position of the injector port 14 is indicated by a broken line in FIG. 4 for illustration. A principal direction of injection 29 of an injection jet 30 of the injector 15, which direction is indicated in FIG. 3, is preferably located in the central longitudinal plane 27. The injection jet 30 is of a conical shape in this case, so that we can also speak of an injection cone. It is clear that any other desired geometries may be embodied for the injection jet 30 as well.

Further, the symmetrical, first partition 17 is positioned in the channel 13 such that the two partial exhaust gas flows 20, 21 flow away each from the injector port 14 proximally to the channel wall 24, i.e., in the proximal areas 25, whereas they flow together towards the injector port 14 in distal areas 26.

As can be seen especially in FIGS. 2 through 4, the perforation portion of the first partition 17 has first openings 31 for generating the flow swirls 22, 23, which openings are arranged proximally to the channel wall 24 and which have a discharge area 32 each facing away from the injector port 14 in the injection chamber 16, i.e., on a discharge side of the first partition 17. The discharge areas 32 are formed by means of wall sections 33, which are formed integrally on the first partition 17 and which project from the rest of the first partition 17 into the injection chamber 16. Further, these first openings 31 have an inlet area 34 each facing the injector port 14 on an incoming flow side facing away from the injection chamber 16. These may be advantageously formed by means of wall sections 35 that are likewise formed integrally on the first partition 17 and which project from the rest of the first partition 17 on the discharge side.

As can be determined from FIGS. 2 and 4, the perforation portion of the first partition 17 has, moreover, second openings 36, which likewise have inlet areas facing the injector port 14 and discharge areas facing away from the injector port 14. The inlet areas are located on the side facing away from the injection chamber 16 in this case as well, whereas the discharge areas are arranged within the injection chamber 16. While the first openings 31 extend such that they are distributed proximally to the channel wall 13 in the circumferential direction, the second openings 36 are arranged in a straight line one after the other distally from the channel wall 24, namely, preferably in the central longitudinal plane 27.

As can also be determined from FIGS. 2 and 4, the perforation portion of the first partition 17 may have, in addition, third openings 37, which are located in the plane of the first partition 17.

According to FIGS. 2 and 3, the perforation portion of the second partition 18, not designated more specifically, may comprise first and second openings 38 and 39, which are shielded with guide surfaces 40 each. The guide surfaces 40 also project each into the injection chamber 16. The first openings 38 are arranged proximally to the channel wall 24. They are elongated and extend essentially in the circumferential direction. They are shielded inwardly by the guide surfaces 40. Contrary to this, the second openings 40 are arranged distally from the channel wall 24 and are shielded by means of the guide surfaces 40 on a side facing the injector port 14. The second openings 39 are likewise elongated, but straight, and extend in parallel to one another. The straight, elongated second openings extend at right angles to the central longitudinal plane 27. The second partition 18 is likewise mirror-symmetrical to the central longitudinal plane 27; however, it differs from the first partition 17.

The third partition, which is only provided optionally, contains only a kind of openings 41 that are located each in the plane of the third partition 19 and which define a uniform perforation portion in the example being shown. The third partition 19 is preferably a simple perforated plate. The third partition 19 is thus especially different from the first partition 17 and is shaped towards the second partition 18. It is conceivable in this case as well to provide a non-uniform perforation portion, i.e., a perforation portion that has different openings with and/or without covers and/or guide surfaces.

The three partitions 17, 18, 19 have each basically a flat configuration, and integral sections of the respective partition 17, 18 may be deformed and opened in the second partition 18 in order to form the individual openings or the flow guide contours.

The first partition 17 extends essentially at right angles to the central longitudinal axis 28 of the channel 23. The third partition 19 also preferably extends at right angles to the central longitudinal axis 28 and thus in parallel to the first partition 17. Contrary to this, the second partition 18 extends in a sloped manner in relation to the first partition 17 and thus also sloped in relation to the third partition 19. The slope of the first partition 17 in relation to the second partition 18 is such that the injection chamber 17 tapers with increasing distance from the injector port 14.

While specific embodiments of the invention have been shown and described in detail to illustrate the application of the principles of the invention, it will be understood that the invention may be embodied otherwise without departing from such principles.

What is claimed is:

1. An injection section of an exhaust system for an internal combustion engine, the injection section comprising:
    a channel for guiding an exhaust gas flow;
    an injector port arranged laterally on the channel and to which an injector can be connected for introducing a liquid or gas into the exhaust gas flow;
    an injection chamber, which is formed in the channel in an area of the injector port, the injection chamber being defined by a perforated first partition, arranged in the channel upstream of the injector port relative to the exhaust gas flow and through which the exhaust gas flow can flow, and also a perforated second partition, arranged in the channel downstream of the injector port in relation to the exhaust gas flow and through which the exhaust gas flow can flow, wherein:
    a perforation portion of the first partition generates at least two partial exhaust gas flows, which form two mutually opposite flow swirls, during a flow through the first partition within the injection chamber, one of the two partial exhaust gas flows moving in a first flow direction, another one of the at least two partial exhaust gas flows moving in a second flow direction, the first flow direction being opposite the second flow direction, wherein the one of the at least two partial exhaust gas flows is laterally adjacent to the another one of the at least two partial exhaust gas flows; and
    the two partial exhaust gas flows flow separately proximally to a channel wall, defining the injection chamber laterally, and flow together distally from the channel wall.

2. An injection section in accordance with claim 1, wherein the perforation portion of the first partition is symmetrical to a central longitudinal plane of the channel, so that the two flow swirls are formed symmetrically to the central longitudinal plane during a flow through the first partition.

3. An injection section in accordance with claim 2, wherein the injector port is arranged in this central longitudinal plane.

4. An injection section in accordance with claim 1, wherein the two partial exhaust gas flows flow away each from the injector port proximally to the channel wall and flow together towards the injector port distally from the channel wall.

5. An injection section in accordance with claim 1, wherein for generating the flow swirls, the perforation portion of the first partition has first openings, which are arranged proximally to the channel wall and which has a discharge area each facing away from the injector port in the injection chamber.

6. An injection section in accordance with claim 5, wherein the discharge areas are formed by means of wall sections of the first partition, which wall sections project from a remainder of the first partition into the injection chamber.

7. An injection section in accordance with claim 5, wherein the first openings have an inlet area each facing the injector port on an incoming flow side facing away from the injection chamber.

8. An injection section in accordance with claim 1, wherein a perforation portion of the second partition has openings, which are shielded with guide surfaces, which project into the injection chamber.

9. An injection section in accordance with claim 8, wherein the openings of the perforation portion of the second partition have first openings, which are arranged proximally to the channel wall, are elongated and extend essentially in the circumferential direction and which are shielded in the radially inwardly direction by the respective guide surface.

10. An injection section in accordance with claim 8, wherein the openings of the perforation portion of the second partition have second openings, which are arranged distally from the channel wall and which are shielded with the respective guide surface towards the injector port.

11. An injection section in accordance with claim 1, wherein the first partition extends essentially at right angles to a central longitudinal axis of the channel.

12. An injection section in accordance with claim 1, wherein the second partition is sloped relative to the first partition, such that the injection chamber tapers with increasing distance from the injector port.

13. An injection section in accordance with claim 1, further comprising a perforated, third partition, through which the exhaust gas flow can flow, is provided, which is arranged downstream of the second partition relative to the exhaust gas flow.

14. A catalytic converter device for an exhaust system of an internal combustion engine, the catalytic converter device comprising:
    a tubular housing for guiding an exhaust gas flow, the tubular housing having an outlet section;
    a selective catalytic reduction (SCR) catalytic converter in the outlet section; and
    an injection section comprising:
    a channel for guiding an exhaust gas flow;
    an injector port arranged laterally on the channel and to which an injector can be connected for introducing a liquid or gas into the exhaust gas flow;

an injection chamber, which is formed in the channel in an area of the injector port, the injection chamber being defined by a perforated first partition, arranged in the channel upstream of the injector port relative to the exhaust gas flow and through which the exhaust gas flow can flow, and also a perforated second partition, arranged in the channel downstream of the injector port in relation to the exhaust gas flow and through which the exhaust gas flow can flow, wherein:

one perforation portion of the first partition generates at least two partial exhaust gas flows, which form two mutually opposite flow swirls, during a flow through the first partition within the injection chamber, one of the two mutually opposite flow swirls moving in a first flow direction, another one of the two mutually opposite flow swirls moving in a second flow direction, the first flow direction being opposite the second flow direction, wherein the one of the two mutually opposite flow swirls is laterally adjacent to the another one of the two mutually opposite flow swirls;

the two partial exhaust gas flows flow separately proximally to a channel wall, defining the injection chamber laterally, and flow together distally from the channel wall; and the injection section is arranged upstream of the SCR catalytic converter relative to the exhaust gas flow.

15. A catalytic converter device in accordance with claim 14, wherein the channel of the injection section forms a separate section of the tubular housing of the catalytic converter device.

16. A catalytic converter device in accordance with claim 14, further comprising an oxidation catalytic converter, wherein the tubular housing has an inlet section, which contains an oxidation catalytic converter upstream of the injection section relative to the exhaust gas flow.

17. A catalytic converter device in accordance with claim 15, further comprising an oxidation catalytic converter, wherein the tubular housing has an inlet section, which contains an oxidation catalytic converter upstream of the injection section relative to the exhaust gas flow.

18. An injection section in accordance with claim 14, wherein for generating the flow swirls, the perforation portion of the first partition has first openings, which are arranged proximally to the channel wall and which has a discharge area each facing away from the injector port in the injection chamber.

19. An injection section of an exhaust system for an internal combustion engine, the injection section comprising:

a channel for guiding an exhaust gas flow;

an injector port arranged laterally on the channel and to which an injector can be connected for introducing a liquid or gas into the exhaust gas flow;

an injection chamber, which is formed in the channel in an area of the injector port, the injection chamber being defined by a perforated first partition, arranged in the channel upstream of the injector port relative to the exhaust gas flow and through which the exhaust gas flow can flow, and also a perforated second partition, arranged in the channel downstream of the injector port in relation to the exhaust gas flow and through which the exhaust gas flow can flow, wherein:

a perforation portion of the first partition generates at least two partial exhaust gas flows, which form two mutually opposite flow swirls, during a flow through the first partition within the injection chamber, wherein the perforation portion of the first partition is symmetrical to a central longitudinal plane of the channel, so that the two flow swirls are formed symmetrically to the central longitudinal plane during a flow through the first partition; and the two partial exhaust gas flows flow separately proximally to a channel wall, defining the injection chamber laterally, and flow together distally from the channel wall.

20. An injection section of an exhaust system for an internal combustion engine, the injection section comprising:

a channel for guiding an exhaust gas flow;

an injector port arranged laterally on the channel and to which an injector can be connected for introducing a liquid or gas into the exhaust gas flow;

an injection chamber, which is formed in the channel in an area of the injector port, the injection chamber being defined by a perforated first partition, arranged in the channel upstream of the injector port relative to the exhaust gas flow and through which the exhaust gas flow can flow, and also a perforated second partition, arranged in the channel downstream of the injector port in relation to the exhaust gas flow and through which the exhaust gas flow can flow, wherein:

a perforation portion of the first partition generates at least two partial exhaust gas flows, which form two mutually opposite flow swirls, during a flow through the first partition within the injection chamber, wherein for generating the flow swirls, the perforation portion of the first partition has first openings, which are arranged proximally to the channel wall and which has a discharge area each facing away from the injector port in the injection chamber; and the two partial exhaust gas flows flow separately proximally to a channel wall, defining the injection chamber laterally, and flow together distally from the channel wall.

* * * * *